United States Patent Office 2,829,175
Patented Apr. 1, 1958

2,829,175
PURIFICATION OF BIS-PHENOLS

Robert S. Bowman, Pittsburgh, Arthur C. Dubbs, Springdale, and John F. Hedenburg, Penn Township, Allegheny County, Pa., assignors to Gulf Research & Development Company, Pittsburgh, Pa., a corporation of Delaware No Drawing. Application October 14, 1953
Serial No. 386,114

3 Claims. (Cl. 260—619)

This invention relates to the production of a bis(hydroxyphenyl)alkane and more particularly to a process of recovering a substantially pure bis(hydroxyphenyl)-alkane from closely-related compounds such as the phenolic starting materials used in the preparation of the bis(hydroxyphenyl)alkane and the intermediate or side reaction products obtained from such preparation.

The bis(hydroxyphenyl)alkanes are particularly valuable for use as anti-oxidants in various organic compositions, both solid and liquid, normally tending to undergo oxidational changes. Some of the organic compositions in which a bis(hydroxyphenyl)alkane can be incorporated as an anti-oxidant are motor fuels, aviation fuels, jet fuels, marine fuels, diesel fuels, lubricating oils, turbine oils, transformer oils, furnace oils, waxes, rubber, resins, plastics, animal and vegetable fats and oils, including lard, lard oil, linseed oil, and the like. In addition to their anti-oxidant properties, the bis(hydroxyphenyl)alkanes are also useful alone or in combination with filling materials as the basis of pressed articles, as binding agents, or for preparing varnishes and other coating or impregnating agents. They are further useful as blending agents in the manufacture of various polishing agents such as shoe polish, floor polish, furniture polish, and the like. They may also be used as, or in conjunction with plasticizers, tackifiers, insecticides, and fungicides. When the bis(hydroxyphenyl)alkanes are used in compositions which may come in contact with food products, it is essential that the additive be extremely pure, odorless and non-toxic. Also, when the compounds are used in light-colored products, particularly light rubber such as that used in white side-wall tires, it is essential that the compounds be sufficiently pure that they will not discolor the rubber. Of course, this is also important when the compounds are incorporated in other light products, such as paraffin wax, lard, and the like.

We have found that by treating a composition comprising a bis(hydroxyphenyl)alkane at a relatively low temperature with an amine selected from the group consisting of hydrazine, alkyl amines, cycloalkyl amines, alkenyl amines, alkanol amines, aralkyl amines and heterocyclic amines an adduct is formed between the bis(hydroxyphenyl)alkane and the amine. This adduct, after separation from the reaction mass, can be readily dissociated into a substantially pure amine and a substantially pure bis(hydroxyphenyl)alkane. While the process of our invention is particularly advantageous in purifying a bis(hydroxyphenyl)alkane, the process is also applicable to the purification of amines. Of course, when an amine is to be purified the bis(hydroxyphenyl)alkane can comprise a crude mixture of such bis(hydroxyphenyl alkanes.

Some of the impurities which may be removed from the bis(hydroxyphenyl)alkanes in accordance with the process of the invention are the phenolic starting materials, intermediate and side reaction products, polymers and resins. The process is also applicable to the separation of homologous bis(hydroxyphenyl)alkanes inasmuch as the various bis(hydroxyphenyl)alkane amine adducts have different solubility characteristics.

The amines employed in accordance with the invention are selected from the class consisting of hyrdazine, alkyl amines, cycloalkyl amines, alkenyl amines, alkanol amines, aralkyl amines and heterocyclic amines. Examples of some of the preferred amines within this class are hydrazine, methylamine, ethylamine, n-butylamine, dimethylamine, diethylamine, di-n-propylamine, di-isopropylamine, di-n-butylamine, trimethylamine, triethylamine, tri-n-propylamine, tri-n-butylamine, allylamine, ethanolamine, ethylenediamine, 1,3-diaminopropanol-2, diethanolamine, phenylethanolamine, triethanolamine, di-octylaminoethanol, triethylenetetramine, 3-dimethylamino-1,2-propanediol, lauryldimethylamine, cetyldimethyl-amine, cyclohexylamine, dicyclohexylamine, benzylamine, pyridine, 4-methylpyridine, 2,6-lutidine, 2-methyl-5-ethyl-pyridine, 2-amino-3-methylpyridine, quinoline, isoquinoline, 2-methylquinoline, piperidine and morpholine.

The bis(hydroxyphenyl)alkanes which can be purified in accordance with the process of the invention are those obtained by the condensation of a phenol and an organic carbonyl compound. As examples of the phenols which may be condensed with an organic carbonyl compound are phenol, cresols, xylenols, ethylphenols, and alkyl, hydroxyalkyl, haloalkyl, alkoxyalkyl, alkoxy, nitro and halo derivatives thereof. Specific examples of the phenols include phenol (itself); meta-cresol; para-cresol; ortho-cresol; 2,4-dimethylphenol; 2-ethylphenol; 2,4-diethyl-phenol; 2-isopropylphenol; 2-isopropyl-4-methylphenol; 2,4-diisopropylphenol; 2-sec-butylphenol; 2-tert-butyl-phenol; 4-sec-butylphenol; 4-tert-butylphenol; 2,4-di-sec-butylphenol; 2,4-di-tert-butylphenol; 2-methyl-4-tert-butylphenol; 2-methyl-4-sec-butylphenol; 2-sec-butyl-4-methylphenol; 2 - tert - butyl - 4 - methylphenol; 2 - sec-butyl-4-ethylphenol; 2-tert-butyl-4-ethylphenol; 3-methyl-6 - sec - butylphenol; 3 - methyl - 6 - tert - butylphenol; 3 - methyl - 4 - sec - butylphenol; 3 - methyl - 4-tert-butylphenol; 4-isooctylphenol; 2-methyl-4-isooctyl-phenol; para-chlorophenol; meta-nitrophenol; and the like.

As examples of the organic carbonyl compounds which can be used in the condensation of the phenols, are the ketones and the aldehydes. Specific examples of some of the ketones which may be used are as follows: acetone; methyl ethyl ketone; methyl isobutyl ketone; 1,3-diphenyl-2-propanone; propiophenone; 1-phenyl-2-propanone; 3,3-dimethyl-2-butanone; 3,3-diphenyl-2-butanone; 3-methyl-2-butanone; 1-phenyl-2-butanone; 4-phenyl-2-butanone; 2-pentanone; 3-methyl-2-pentanone; 4-methyl-2-pentanone; 2,2,4,4-tetramethyl-3- pentanone; 3-pentanone; 2,4-dimethyl-3-pentanone; 2-methyl-3-pentanone; 4,4-dimethyl-2-pentonone; 2-hexanone; 5-methyl-2-hexanone; 3-hexanone; 5-methyl-3-hexanone; 2-heptanone; 3-heptanone; 6-methyl-3-heptanone; 4-heptanone; 2,6-dimethyl-4-heptanone; 2-methyl-4-heptanone; 2-octanone; 3-octanone; 2-nonanone; 3-nonanone; 5-nonanone; 2,8-dimethyl-5-nonanone; 2-decanone; 3-decanone; 4-decanone; bezophenone; 4,4'-dimethylbenzophenone; acetophenone; 5-isopropyl-2-methylacetophenone; p-methylacetophenone; desoxybenzoin; butyrophenone; isobutyrophenone; and the like. The aldehydes which may be used are formaldehyde; acetaldehyde; propionaldehyde; butyraldehyde; iso-butyraldehyde; isovaleraldehyde; caproaldehyde; benzaldehyde; salicylaldehyde; cinnamaldehyde; ortho-, meta-, and para-tolualdehyde; phenylacetaldehyde; 2-ethylhex-aldehyde; pivalaldehyde; and the like.

In the preparation of the condensation products, 2 mols of the phenol are reacted with one mol of the organic carbonyl compound in the presence of a condensation catalyst such as anhydrous hydrogen chloride and zinc chloride. The ratio of the phenol to the organic carbonyl compound is, therefore, advantageously maintained at about 2:1. This ratio is based upon the use of a monomer of the organic carbonyl compound. If a polymeric aldehyde is employed, the amount of the polymer used is based upon the equivalent number of mols of the monomer appearing in the polymer. For instance, if a trimer of the aldehyde is used, such as trioxane, the molecular ratio of the phenol to the trimer would be about 6:1. The reaction is advantageously carried out in the presence of a common solvent such as glacial acetic acid, hexane, benzene, and the like. In the course of the reaction water is formed, the reaction product separating out as a liquid or a solid. Upon separation of the reaction product from the solvent layer, such as glacial acetic acid when it is the solvent, the reaction product is washed with water and/or aqueous alkali solution. This washing removes any remaining acid condensation catalyst and also any remaining acetic acid solvent. The washed product thus obtained, however, may contain undesirable amounts of contaminants including unreacted phenolic starting materials, intermediate and side reaction products, polymers and resins. While some purification can be accomplished by recrystallization, a high degree of purity ordinarily requires in the order of four or five recrystallizations, with a considerable loss in yield taking place with each recrystallization. In accordance with the present invention, a high degree of purification with correspondingly high yields is obtained through the formation of an adduct.

In addition to anhydrous hydrogen chloride and zinc chloride, other condensation catalysts which can be used for condensing the phenol with the organic carbonyl compound include sulfuric acid, phosphoric acid, anhydrous aluminum chloride, boron trifluoride, boron fluoride complexes, ferric chloride, anhydrous zinc chloride, activated clays such as acid-treated fuller's earth, bentonite, floridin, silica-alumina, and the like. The amount of the condensing agent required may be about 0.1 percent based on the total weight of the reactants. However, larger amounts as high as about 20 percent by weight may also be employed. More than about 10 percent of the condensation catalyst is not ordinarily necessary. The condensation reaction is carried out at a temperature below about 100° C. and advantageously at a temperature within the range of about 0° to about 50° to 55° C. If the temperature is allowed to exceed 100° C. for an extended preiod of time, an excess of undesirable side reactions may take place.

Specific examples of some of the compounds which are prepared by the condensation reaction and which may be purified by the process of this invention include bis(2-hydroxyphenyl)methane; bis(4 - hydroxyphenyl)methane; 1,1-bis(2-hydroxyphenyl)ethane; 1,1-bis(4-hydroxyphenyl)ethane; 1,1 - bis(2-hydroxyphenyl)-propane; 1,1-bis(4-hydroxyphenyl)propane; 1,1 - bis(2-hydroxyphenyl)butane; 1,1 - bis(4-hydroxyphenyl)butane; 2,2-bis(4-hydroxyphenyl)propane; 2,2-bis(4-hydroxyphenyl)-butane; 2,2 - bis(2 - hydroxyphenyl)propane; bis(2-hydroxy-3-methylphenyl)methane; 1,1 - bis(2-hydroxy-3-methylphenyl)ethane; 1,1-bis(2-hydroxy - 3 - methylphenyl)propane; 1,1-bis(2-hydroxy - 3 - methylphenyl)-butane; 1,1-bis(2-hydroxy - 3 - methylphenyl)isobutane; bis(2-hydroxy-4-methylphenyl)methane; 1,1 - bis(2-hydroxy-4-methylphenyl)ethane; 1,1-bis(2-hydroxy-4-methylphenyl)propane; 1,1 - bis(2-hydroxy-4-methylphenyl)-butane; 1,1-bis(2-hydroxy-4-methylphenyl)isobutane; bis-(2-hydroxy-5-methylphenyl)methane; 1,1-bis(2-hydroxy-5-methylphenyl)ethane; 1,1-bis(2-hydroxy - 5 - methylphenyl)propane; 1,1 - bis(2-hydroxy-5-methylphenyl)-butane; 1,1 - bis(2 - hydroxy - 5 - methylphenyl) - isobutane; bis(2-hydroxy-3-ethylphenyl)methane; 1,1-bis(2-hydroxy-3-ethylphenyl)ethane; 1,1-bis(2-hydroxy-3-ethylphenyl)propane; 1,1-bis(2-hydroxy-3-ethylphenyl)butane; 1,1 - bis(2-hydroxy-3-ethylphenyl)isobutane; bis(2-hydroxy-3-isopropylphenyl)methane; 1,1-bis(2 - hydroxy-3-isopropylphenyl)ethane; 1,1-bis(2-hydroxy - 3 - isopropylphenyl)propane; 1,1 - bis(2-hydroxy-3-isopropylphenyl)-butane; 1,1 - bis(2-hydroxy-3-isopropylphenyl)isobutane; bis(2-hydroxy - 3 - sec-butylphenyl)methane; 1,1-bis(2-hydroxy-3-sec-butylphenyl)ethane; 1,1 - bis(2-hydroxy-3-sec-butylphenyl)propane; 1,1 - bis(2-hydroxy-3-sec-butylphenyl)butane; 1,1 - bis(2-hydroxy-3-sec-butylphenyl)isobutane; bis(2-hydroxy-3-t-butylphenyl)methane; 1,1-bis(2-hydroxy-3-t-butylphenyl)ethane; 1,1 - bis(2 - hydroxy-3-t-butylphenyl)propane; 1,1 - bis(2-hydroxy-3-t-butylphenyl)butane; 1,1 - bis(2 - hydroxy - 3 - t-butylphenyl)isobutane; bis(2-hydroxy - 5 - sec-butylphenyl)-methane; 1,1-bis(2 - hydroxy-5-sec-butylphenyl)ethane; 1,1-bis(2-hydroxy-5-sec-butylphenyl)propane; 1,1 - bis(2-hydroxy-5-sec-butylphenyl)butane; 1,1-bis(2 - hydroxy-5-sec-butylphenyl)isobutane; 1,1-bis(2-hydroxy - 5 - sec-butylphenyl-1-phenylethane; 1,1-bis(2 - hydroxy-5-sec-butylphenyl)-1-phenylpropane; bis(2-hydroxy - 5 - sec-butylphenyl)diphenylmethane; bis-(2-hydroxy - 5 - sec-butylphenyl)-4,4'-dimethyldiphenylmethane; bis(2 - hydroxy-5-sec-butylphenyl) - 4 - methylphenylmethane; 1,1-bis(2 - hydroxy-5-sec-butylphenyl)-2-phenylethane; bis(2-hydroxy-5-t-butylphenyl)methane; 1,1 - bis(2 - hydroxy-5-t-butylphenyl)ethane; 1,1 - bis(2 - hydroxy-5-t-butylphenyl)propane; 1,1 - bis(2 - hydroxy-5-t-butylphenyl)-butane; 1,1 - bis(2-hydroxy-5-t-butylphenyl)isobutane; 1,1-bis-(2-hydroxy - 5 - t - butylphenyl)-1-phenylethane; 1,1-bis-(2-hydroxy-5-t-butylphenyl) - 1 - phenylpropane; bis(2 - hydroxy-5-t-butylphenyl)diphenylmethane; bis(2-hydroxy-5 - t - butylphenyl) - 4,4' - dimethyldiphenylmethane; bis(2 - hydroxy-5-t- butylphenyl)-4-methylphenylmethane; 1,1 - bis(2-hydroxy-5-t-butylphenyl)-2-phenylethane; bis(2 - hydroxy-5-isooctylphenyl)methane; 1,1-bis(2-hydroxy - 5 - isooctylphenyl)ethane; 1,1-bis(2-hydroxy-5-isooctylphenyl)propane; 1,1 - bis(2-hydroxy-5-isooctylphenyl)butane; 1,1 - bis(2-hydroxy-5-isooctylphenyl)isobutane; 1,1-bis(2-hydroxy - 5 - isooctylphenyl)-1-phenylethane; 1,1-bis(2-hydroxy - 5 - isooctylphenyl)-1-phenylpropane; bis(2-hydroxy - 5 - isooctylphenyl)diphenylmethane; bis(2-hydroxy - 5 - isooctylphenyl)-4,4'-dimethyldiphenylmethane; bis(2-hydroxy - 5 - isooctylphenyl)-4-methylphenylmethane; 1,1 - bis(2 - hydroxy-5-isooctylphenyl)-2-phenylethane; 2,2 - bis(2 - hydroxy-3-methyl-5-t-butylphenyl)propane; 2,2 - bis(2 - hydroxy-3-methyl-5-t-butylphenyl)butane; 1,1 - bis(2 - hydroxy-3-methyl-5-t-butylphenyl) - 1 - phenylethane; 1,1-bis(2-hydroxy-3-methyl-5-t-butylphenyl) - 1 - phenylpropane; bis(2-hydroxy-3-methyl - 5 - t - butylphenyl)diphenylmethane; bis(2-hydroxy - 3 - methyl-5-t-butylphenyl)-4,4'-dimethyldiphenylmethane; 2,2 - bis(2 - hydroxy-3-methyl - 5 - t - butylphenyl) - 1,3-diphenylpropane; 2,2-bis(2 - hydroxy - 3 - methyl-5-sec-butylphenyl)propane; 1,1-bis(2-hydroxy - 3 - methyl - 5 - sec - butylphenyl)-1-phenylethane; 2,2 - bis(2-hydroxy-3-methyl-5-sec-butylphenyl)butane; 1,1 - bis(2-hydroxy - 3 - methyl-5-sec-butylphenyl)-1-phenylpropane; bis(2 - hydroxy-3-methyl-5-sec-butylphenyl)diphenylmethane; bis(2 - hydroxy-3-methyl - 5 - sec - butylphenyl) - 4,4' - dimethyldiphenylmethane; 2,2-bis(2-hydroxy - 3 - methyl - 5 - sec - butylphenyl)-1,3-diphenylpropane; bis(2-hydroxy - 3 - methyl-5 - t - butylphenyl)methane; bis(2-hydroxy - 3 - methyl-5-sec-butylphenyl)methane; 1,1-bis(2-hydroxy-3-methyl-5-t-butylphenyl)ethane; 1,1-bis(2-hydroxy - 3 - methyl-5-sec-butylphenyl)ethane; 1,1-bis(2-hydroxy-3-methyl-5-t-butylphenyl)propane; 1,1-bis(2-hydroxy-3-methyl-5-sec-butylphenyl)propane; 1,1-bis(2 - hydroxy-3-methyl-5-t-butylphenyl)butane; 1,1-bis(2 - hydroxy-3-methyl-5-sec-butylphenyl)butane; 1,1-bis(2-hydroxy - 3 - methyl-5-t-butylphenyl)isobutane; 1,1-bis(2 - hydroxy - 3 - methyl-5-sec-butylphenyl)isobutane; bis(2-hydroxy-3-methyl-5-t-butylphenyl)phenylmethane; bis(2 - hydroxy-3-methyl-5-sec-butylphenyl)phenylmethane; bis(2-hydroxy-3-methyl-5-t-butylphenyl)-4-methylphenylmethane; bis(2 - hydroxy-3-methyl-5-sec-butylphenyl)-4-methylphenylmethane; 1,1-bis(2-hydroxy-3-methyl-5-t-butylphenyl)- 2-phenylethane; 1,1-bis(2 - hydroxy-3-methyl-5-sec-butylphenyl)-2-phenylethane; bis(2-hydroxy-3-methyl-5-isooctylphenyl)methane; 1,1-bis(2-hydroxy-3-methyl-5-isooctylphenyl)ethane; 1,1-bis(2-hydroxy-3-methyl-5-isooctylphenyl)propane; 1,1-bis(2-hydroxy-3-methyl-5-isooctylphenyl)butane; 1,1-bis(2-hydroxy-3-methyl-5-isooctylphenyl)isobutane; 1,1-bis(2-hydroxy-3-methyl-5-isooctylphenyl)-1-phenylethane; 1,1-bis(2-hydroxy-3-methyl-5-isooctylphenyl)-1-phenylpropane; bis(2-hydroxy-3-methyl-5-isooctylphenyl)diphenylmethane; bis(2-hydroxy-3-methyl-5-isooctylphenyl)-4,4'-dimethyldiphenylmethane; bis(2-hydroxy-3-methyl-5-isooctylphenyl)-4-methylphenylmethane; 1,1-bis(2-hydroxy-3-methyl-5-isooctylphenyl)-2-phenylethane; 2,2-bis(2-hydroxy-3-ethyl-5-t-butylphenyl)propane; 2,2-bis(2-hydroxy-3-ethyl-5-t-butylphenyl)butane; 1,1-bis(2-hydroxy-3-ethyl-5-t-butylphenyl)-1-phenylethane; 1,1-bis(2-hydroxy-3-ethyl-5-t-butylphenyl)-1-phenylpropane; bis(2-hydroxy-3-ethyl-5-t-butylphenyl)diphenylmethane; bis(2-hydroxy-3-ethyl-5-t-butylphenyl)-4,4'-dimethyldiphenylmethane; 2,2-bis(2-hydroxy-3-ethyl-5-t-butylphenyl)-1,3-diphenylpropane; 2,2-bis(2-hydroxy-3-ethyl-5-sec-butylphenyl)propane; 2,2-bis(2-hydroxy-3-ethyl-5-sec-butylphenyl)butane; 1,1-bis(2-hydroxy-3-ethyl-5-sec-butylphenyl)-1-phenylethane; 1,1-bis(2-hydroxy-3-ethyl-5-sec-butylphenyl)-1-phenylpropane; bis(2-hydroxy-3-ethyl-5-sec-butylphenyl)diphenylmethane; bis(2-hydroxy-3-ethyl-5-sec-butylphenyl)-4,4'-dimethyldiphenylmethane; 2,2-bis(2-hydroxy-3-ethyl-5-sec-butylphenyl)-1,3-diphenylpropane; bis(2-hydroxy-3-ethyl-5-t-butylphenyl)methane; bis(2-hydroxy-3-ethyl-5-sec-butylphenyl)methane; 1,1-bis(2-hydroxy-3-ethyl-5-t-butylphenyl)ethane; 1,1-bis(2-hydroxy-3-ethyl-5-sec-butylphenyl)ethane; 1,1-bis(2-hydroxy-3-ethyl-5-t-butylphenyl)propane; 1,1-bis(2-hydroxy-3-ethyl-5-sec-butylphenyl)propane; 1,1-bis(2-hydroxy-3-ethyl-5-t-butylphenyl)butane; 1,1-bis(2-hydroxy-3-ethyl-5-sec-butylphenyl)butane; 1,1-bis(2-hydroxy-3-ethyl-5-t-butylphenyl)isobutane; 1,1-bis(2-hydroxy-3-ethyl-5-sec-butylphenyl)isobutane; bis(2-hydroxy-3-ethyl-5-t-butylphenyl)phenylmethane; bis(2-hydroxy-3-ethyl-5-sec-butylphenyl)phenylmethane; bis(2-hydroxy-3-ethyl-5-sec-butylphenyl)-4-methylphenylmethane; bis(2-hydroxy-3-ethyl-5-t-butylphenyl)-4-methylphenylmethane; 1,1-bis(2-hydroxy-3-ethyl-5-t-butylphenyl)-2-phenylethane; 1,1-bis(2-hydroxy-3-ethyl-5-sec-butylphenyl)-2-phenylethane; bis(2-hydroxy-3,5-dimethylphenyl)methane; 1,1-bis(2-hydroxy-3,5-dimethylphenyl)ethane; 1,1-bis(2-hydroxy-3,5-dimethylphenyl)propane; 1,1-bis(2-hydroxy-3,5-dimethylphenyl)butane; 1,1-bis(2-hydroxy-3,5-dimethylphenyl)isobutane; bis(2-hydroxy-3,5-diethylphenyl)methane; 1,1-bis(2-hydroxy-3,5-diethylphenyl)ethane; 1,1-bis(2-hydroxy-3,5-diethylphenyl)propane; 1,1-bis(2-hydroxy-3,5-diethylphenyl)butane; 1,1-bis(2-hydroxy-3,5-diethylphenyl)isobutane; bis(2-hydroxy-3-isopropyl-5-methylphenyl)methane; 1,1-bis(2-hydroxy-3-isopropyl-5-methylphenyl)ethane; 1,1-bis(2-hydroxy-3-isopropyl-5-methylphenyl)propane; 1,1-bis(2-hydroxy-3-isopropyl-5-methylphenyl)butane; 1,1-bis(2-hydroxy-3-isopropyl-5-methylphenyl)isobutane; 1,1-bis(2-hydroxy-3-isopropyl-5-methylphenyl)-1-phenylethane; 1,1-bis(2-hydroxy-3-isopropyl-5-methylphenyl)-1-phenylpropane; bis(2-hydroxy-3-isopropyl-5-methylphenyl)diphenylmethane; bis(2-hydroxy-3-isopropyl-5-methylphenyl)-4,4'-dimethyldiphenylmethane; bis(2-hydroxy-3-isopropyl-5-methylphenyl)-4-methylphenylmethane; 1,1-bis(2-hydroxy-3-isopropyl-5-methylphenyl)-2-phenylethane; bis(2-hydroxy-3,5-diisopropylphenyl)methane; 1,1-bis(2-hydroxy-3,5-diisopropylphenyl)ethane; 1,1-bis(2-hydroxy-3,5-diisopropylphenyl)propane; 1,1-bis(2-hydroxy-3,5-diisopropylphenyl)butane; 1,1-bis(2-hydroxy-3,5-diisopropylphenyl)isobutane; bis(2-hydroxy-3,5-di-sec-butylphenyl)methane; 1,1-bis(2-hydroxy-3,5-di-sec-butylphenyl)ethane; 1,1-bis(2-hydroxy-3,5-di-sec-butylphenyl)propane; 1,1-bis(2-hydroxy-3,5-di-sec-butylphenyl)butane; 1,1-bis(2-hydroxy-3,5-sec-butylphenyl)isobutane; bis(2-hydroxy-3,5-di-t-butylphenyl)methane; 1,1-bis(2-hydroxy-3,5-di-t-butylphenyl)ethane; 1,1-bis(2-hydroxy-3,5-di-t-butylphenyl)propane; 1,1-bis(2-hydroxy-3,5-di-t-butylphenyl)butane; 1,1-bis(2-hydroxy-3,5-di-t-butylphenyl)isobutane; 2,2-bis(2-hydroxy-3-sec-butyl-5-methylphenyl)propane; 2,2-bis(2-hydroxy-3-sec-butyl-5-methylphenyl)butane; 1,1-bis(2-hydroxy-3-sec-butyl-5-methylphenyl)-1-phenylethane; 1,1-bis(2-hydroxy-3-sec-butyl-5-methylphenyl)-1-phenylpropane; bis(2-hydroxy-3-sec-butyl-5-methylphenyl)diphenylmethane; bis(2-hydroxy-3-sec-butyl-5-methylphenyl)-4,4'-dimethyldiphenylmethane; 2,2-bis(2-hydroxy-3-sec-butyl-5-methylphenyl)-1,3-diphenylpropane; bis(2-hydroxy-3-sec-butyl-5-methylphenyl)methane; 1,1-bis(2-hydroxy-3-sec-butyl-5-methylphenyl)ethane; 1,1-bis(2-hydroxy-3-sec-butyl-5-methylphenyl)ethane; 1,1-bis(2-hydroxy-3-t-butyl-5-methylphenyl)propane; 1,1-bis(2-hydroxy-3-sec-butyl-5-methylphenyl)propane; 1,1-bis(2-hydroxy-3-t-butyl-5-methylphenyl)butane; 1,1-bis(2-hydroxy-3-t-butyl-5-methylphenyl)isobutane; bis(2-hydroxy-3-t-butyl-5-methylphenyl)phenylmethane; bis(2-hydroxy-3-t-butyl-5-methylphenyl)-4-methylphenylmethane; 1,1-bis(2-hydroxy-3-t-butyl-5-methylphenyl)-2-phenylethane; 1,1-bis(2-hydroxy-3-sec-butyl-5-methylphenyl)butane; 1,1-bis(2-hydroxy-3-sec-butyl-5-methylphenyl)isobutane; bis(2-hydroxy-3-sec-butyl-5-methylphenyl)phenylmethane; bis(2-hydroxy-3-sec-butyl-5-methylphenyl)-4-methylphenylmethane; 1,1-bis(2-hydroxy-3-sec-butyl-5-methylphenyl)-2-phenylethane; bis(2-hydroxy-3-sec-butyl-6-methylphenyl)methane; 1,1-bis(2-hydroxy-3-sec-butyl-6-methylphenyl)ethane; 1,1-bis(2-hydroxy-3-sec-butyl-6-methylphenyl)propane; 1,1-bis(2-hydroxy-3-sec-butyl-6-methylphenyl)butane; 1,1-bis(2-hydroxy-3-sec-butyl-6-methylphenyl)isobutane; 1,1-bis(2-hydroxy-3-sec-butyl-6-methylphenyl)-1-phenylethane; 1,1-bis(2-hydroxy-3-sec-butyl-6-methylphenyl)-1-phenylpropane; bis(2-hydroxy-3-sec-butyl-6-methylphenyl)diphenylmethane; bis(2-hydroxy-3-sec-butyl-6-methylphenyl)-4,4'-dimethyldiphenylmethane; bis(2-hydroxy-3-sec-butyl-6-methylphenyl)-4-methylphenylmethane; 1,1-bis(2-hydroxy-3-sec-butyl-6-methylphenyl)-2-phenylethane; bis(2-hydroxy-3-t-butyl-6-methylphenyl)methane; 1,1-bis(2-hydroxy-3-t-butyl-6-methylphenyl)ethane; 1,1-bis(2-hydroxy-3-t-butyl-6-methylphenyl)propane; 1,1-bis(2-hydroxy-3-t-butyl-6-methylphenyl)butane; 1,1-bis(2-hydroxy-3-t-butyl-6-methylphenyl)isobutane; bis(2-hydroxy-3-t-butyl-6-methylphenyl)-4-methylphenylmethane; 1,1-bis(2-hydroxy-3-t-butyl-6-methylphenyl)-2-phenylethane; bis(2-methyl-4-hydroxy-5-sec-butylphenyl)methane; 1,1-bis(2-methyl-4-hydroxy-5-sec-butylphenyl)ethane; 1,1-bis(2-methyl-4-hydroxy-5-sec-butylphenyl)propane; 1,1-bis(2-methyl-4-hydroxy-5-sec-butylphenyl)butane; 1,1-bis(2-methyl-4-hydroxy-5-sec-butylphenyl)isobutane; 1,1-bis(2-methyl-4-hydroxy-5-sec-butylphenyl)-1-phenylethane; 1,1-bis(2-methyl-4-hydroxy-5-sec-butylphenyl)-1-phenylpropane; bis(2-methyl-4-hydroxy-5-sec-butylphenyl)diphenylmethane; bis(2-methyl-4-hydroxy-5-sec-butylphenyl)-4,4'-dimethyldiphenylmethane; bis(2-methyl-4-hydroxy-5-sec-butylphenyl)-4-methylphenylmethane; 1,1-bis(2-methyl-4-hydroxy-5-sec-butylphenyl)-2-phenylethane; bis(2-methyl-4-hydroxy-5-t-butylphenyl)methane; 1,1-bis(2-methyl-4-hydroxy-5-t-butylphenyl)ethane; 1,1-bis(2-methyl-4-hydroxy-5-t-butylphenyl)propane; 1,1-bis(2-methyl-4-hydroxy-5-t-butylphenyl)butane; 1,1-bis(2-methyl-4-hydroxy-5-t-butylphenyl)isobutane; 1,1-bis(2-methyl-4-hydroxy-5-t-butylphenyl)-1-phenylethane; 1,1-bis(2-methyl-4-hydroxy-5-t-butylphenyl)-1-phenylpropane; bis(2-methyl-4-hydroxy-5-t-butylphenyl)diphenylmethane; bis(2-methyl-4-hydroxy-5-t-butylphenyl)-4,4'-dimethyldiphenylmethane; bis(2-methyl-4-hydroxy-5-t-butylphenyl)-4-methylphenylmethane; 1,1-bis(2-methyl-4-hydroxy-5-t-butylphenyl)-2-phenylethane; bis(2-hydroxy-4-methyl-5-sec-butylphenyl)methane; 1,1-bis(2-hydroxy-4-methyl-5-sec-butylphenyl)ethane; 1,1-bis(2-hydroxy-4-methyl-5-sec-butylphenyl)propane; 1,1-bis(2-hydroxy-4-methyl-5-sec-butylphenyl)butane; 1,1-bis(2-hydroxy-4-methyl- 5-sec-butylphenyl)isobutane; 1,1-bis(2-hydroxy-4-methyl-5-sec-butylphenyl)-1-phenylethane; 1,1-bis(2-hydroxy-4-methyl-5-sec-butylphenyl) - 1 - phenylpropane; bis(2-hydroxy-4-methyl-5-sec-butylphenyl)diphenylmethane; bis-(2-hydroxy - 4 - methyl-5-sec-butylphenyl)-4,4'-dimethyldiphenylmethane; bis(2-hydroxy - 4 - methyl-5-sec-butylphenyl)-4-methylphenylmethane; 1,1 - bis(2-hydroxy-4-methyl - 5 - sec - butylphenyl)-2-phenylethane; bis(2-hydroxy - 4 - methyl-5-t-butylphenyl)methane; 1,1bis(2-hydroxy-4-methyl - 5 - t - butylphenyl)ethane; 1,1-bis(2-hydroxy-4-methyl-5-t-butylphenyl)propane; 1,1 - bis(2-hydroxy - 4 - methyl-5-t-butylphenyl)butane; 1,1-bis(2-hydroxy-4-methyl - 5 - t - butylphenyl)isobutane; 1,1-bis(2-hydroxy-4-methyl-5-t-butylphenyl)-1-phenylethane; 1,1-bis(2-hydroxy - 4 - methyl-5-t-butylphenyl)-1-phenylpropane; bis(2-hydroxy-4-methyl-5-t-butylphenyl)diphenylmethane; bis(2-hydroxy-4-methyl-5-t-butylphenyl)-4,4'-dimethyldiphenylmethane; bis(2 - hydroxy-4-methyl-5-t-butylphenyl)-4-methylphenylmethane; 1,1-bis(2-hydroxy-4-methyl-5-t-butylphenyl)-2-phenylethane; and the like.

The bis(hydroxyphenyl)alkanes are generally solid under normal atmospheric conditions. It is desirable, therefore, to dissolve the product in an inert solvent prior to contacting with the amine. Solvents which may be used for this invention are hexane, benzene, naphtha, cyclohexane, alcohol, carbontetrachloride, chloroform, ether, dioxane, triisobutylene, Stoddard solvent, and the like. Naturally, the amount of solvent used will depend upon the amount of solid product that a particular solvent will dissolve. The particular solvent employed should be one which has little, if any, solvent action on the particular adduct being made. Therefore, the solvent will dissolve the bis(hydroxyphenyl)alkane in preference to the amine complex. Stoddard solvent is particularly suitable for the process of the invention. Alcohol can be used but is less desirable than some of the other solvents in that it has good solvent action on the adduct as well as the bis(hydroxyphenyl)alkane.

When the bis(hydroxyphenyl)alkane has been dissolved in the solvent, adduct formation is accomplished by intimately mixing the amine with the solution of bis(hydroxyphenyl)alkane. When the amine is a gas, adduct formation is accomplished by introducing the gas below the surface of the solution. Because of the relatively low dissociation temperature of the adduct which is formed the contacting with the amine is carried out at a relatively low temperature. We have found that the temperature is preferably maintained at about 0° to about 30° C. at atmospheric pressure. It will be understood, of course, that higher temperatures can be employed if the partial pressure of the amine is maintained above the dissociation pressure of the complex. The adduct formation can be carried out either at atmospheric, subatmospheric or superatmospheric pressure as long as the amine partial pressure at the particular temperature employed is greater than the dissociation pressure of the complex. When the amine is first added to the solution there is generally a slight rise in the temperature of the solution indicating that an exothermic reaction is taking place between the bis(hydroxyphenyl)alkane and the amine. The amine is advantageously added until the rise in temperature subsides. The amount of amine taken up depends upon the bis(hydroxyphenyl)alkane employed and comprises about 1 to 2 mols of amine per mol of bis(hydroxyphenyl)alkane. Adduct formation is evidenced by the exothermic heat of reaction and in most cases by the settling of a precipitate from the solution. If only an increase in temperature is noted, precipitation of the adduct may be induced by lowering the temperature of the solution below that temperature at which the adduct will remain in solution, i. e., below the saturation temperature. As mentioned above, the particular solvent employed is also significant in this regard. By proper selection of solvents various homologues of the bis(hydroxyphenyl)alkanes can be separated from one another by the process of the invention. The precipitate which forms comprises a complex between the amine and the bis(hydroxyphenyl)alkane. The adduct is then separated from the solution. If a very high degree of purification of the bis(hydroxyphenyl)alkane is desired, the adduct may be washed one or more times with solvent or with solvent saturated with the particular amine which was used in the formation of the adduct.

The adducts which are formed in accordance with the process of the invention are new products useful in fungicidal and bactericidal preparations and also serve as a means of supplying pure amine or bis(hydroxyphenyl)alkane as needed simply by warming the adduct. The adduct may also be used to maintain a partial pressure of the particular amine where desired.

The adduct is dissociated into an amine and a bis(hydroxyphenyl)alkane either by heating the adduct to a temperature above the dissociation temperature or by reducing the pressure below the pressure at which the adduct is stable. Naturally, the temperature and pressure at which the adduct will dissociate will vary depending upon the particular bis(hydroxyphenyl)alkaneamine adduct. In most instances the dissociation takes place readily at temperatures above about 50° C. at atmospheric pressure. The dissociation is advantageously carried out at a temperature not exceeding the melting point of the pure bis(hydroxyphenyl)alkane which, for example, in the case of bis(2-hydroxy-3-t-butyl-5-methylphenyl)methane would be at a temperature not exceeding about 131° C. Dissociation at atmospheric pressure in most instances can be carried out at about 50° to about 100° C. with a temperature of about 60° to about 70° C. being preferred. Dissociation may also be readily effected at pressures below about 100 mm. Hg at room temperature. Dissociation may also be effected by other means such as by the addition of water, dilute acids, and other materials having high affinity either for the amine or for the bis(hydroxyphenyl)alkane.

The following specific examples will illustrate the preparation and the purification of bis(hydroxyphenyl)alkanes in accordance with the process of the invention.

Into a three-liter flask were placed 1000.6 grams (6.1 mols) of 2-tertiary-butyl-4-methylphenol, two liters of glacial acetic acid and 0.6 gram of anhydrous zinc chloride. When solution was complete 140 grams (3.18 mols) of acetaldehyde were added. The solution thus formed was cooled to a temperature of about 15° to about 20° C. in an ice bath after which anhydrous hydrogen chloride was introduced slowly below the surface of the solution. The addition of hydrogen chloride was continued for about 6.5 hours while maintaining the temperature of the reactants between about 15° and about 20° C. The reaction mixture was then allowed to stand until the next day (about sixteen hours) at which time the mixture was a turbid viscous liquid. Anhydrous hydrogen chloride was then introduced into the mixture for an additional 1.5 hours until the whole mass solidified. The solid thus formed was stirred into water and then filtered. Washing with water was repeated until the mass no longer had the odor of acetic acid. The crude product thus obtained consisted essentially of 1,1-bis(2-hydroxy-3-t-butyl-5-methylphenyl)ethane and had a melting point of about 85° to about 93° C. The crude product thus obtained was then dissolved in two liters of petroleum naphtha. To the solution thus formed were added 280 grams (3.5 mols) of pyridine. The solution thus formed was cooled to about 15° to about 20° C. in an ice bath whereupon white crystals were formed. These crystals comprised the adduct between 1,1-bis(2-hydroxy-3-t-butyl-5-methylphenyl)ethane and pyridine. These crystals were separated from the naphtha solution by filtration and then dried. The melting point of the adduct was about 118° to 119° C. The dried product was then placed in an oven maintained at 90° C. and 1 mm. Hg pressure. Dissociation of the adduct thus took place and pyridine was collected in a cold trap. After all of the pyridine had been removed 788.6 grams of 1,1-bis(2-hydroxy-3-t-butyl-5-methylphenly)ethane was obtained. The purified compound thus obtained had a melting point of 105° C.

In accordance with the above procedure a crude product consisting essentially of 1,1-bis(2-hydroxy-3-t-butyl-5-methylphenyl)ethane having a melting point of 78° to 92.5° C. was purified by forming adducts with ethylamine and 4-methylpyridine. The adduct obtained with the ethylamine melted at 109° to 111° C. Dissociation of this adduct at a reduced pressure of about 1 mm. Hg at room temperature gave a purified product melting at 104° to 105.5° C. The adduct obtained with 4-methylpyridine melted at 92.5° to 94° C. The 4-methylpyridine adduct, after standing in the open at room temperature for two days, resulted in a purified product melting at 105.5° to 106.5° C.

To further illustrate the invention crude products consisting essentially of bis(2-hydroxy-3-t-butyl-5-methylphenyl)methane and 1,1-bis(2-hydroxy-3-t-butyl-5-methylphenyl)ethane were purified through adduct formation with various amines. The melting points of the various adducts obtained prior to their dissociation are given in the following tables.

| Amine | Adduct with bis(2-hydroxy-3-t-butyl-5-methylphenyl)methane, melting point, °C. |
|---|---|
| Hydrazine | 112 to 113 |
| Ethylamine | 111 to 113 |
| Diethylamine | 94.5 to 98 |
| Di-n-propylamine | 54.5 to 55.5 |
| Triethylamine | 180.5 to 184.5 |
| Allylamine | 90.5 to 91.5 |
| Ethanolamine | 113 to 118 |
| Ethylenediamine | 66 to 68 |
| 1,3-diaminopropanol-2 | 60 to 63 |
| Diethanolamine | 105.5 to 116 |
| Triethanolamine | 117 to 119.5 |
| Triethylenetetramine | 116 to 125 |
| Pyridine | 44.5 to 46 |
| 2,6-lutidine | 107 to 108 |
| 2-methyl-5-ethylpyridine | 89.5 to 90.5 |
| Isoquinoline | 121.5 to 123 |
| Piperidine | 147 to 149 |

| Amine | Adduct with 1,1-bis-(2-hydroxy-3-t-butyl-5-methylphenyl)ethane, melting point, °C. |
|---|---|
| Hydrazine | 73 to 80 |
| Methylamine | 103.5 to 110 |
| Ethylamine | 109 to 111 |
| Dimethylamine | 73 to 98.5 |
| Diethylamine | 94.5 to 97.5 |
| Di-isopropylamine | 87.5 to 89 |
| Tri-n-propylamine | 62 to 63.5 |
| Allylamine | 84.5 to 87 |
| Cyclohexylamine | 95.5 to 97 |
| Dicyclohexylamine | 88 to 89 |
| Pyridine | 118 to 119 |
| 4-methylpyridine | 92.5 to 94 |
| 2,6-lutidine | 109 to 110.5 |
| 2-methyl-5-ethylpyridine | 105.5 to 106 |
| Piperidine | 104 to 105 |

While our invention has been described above with reference to various specific examples and embodiments, it will be understood that the invention is not limited to such illustrated examples and embodiments and may be variously practiced within the scope of the claims hereinafter made.

We claim:

1. The process of purifying 1,1-bis(2-hydroxy-3-t-butyl-5-methylphenyl)ethane containing as an impurity a small amount of a compound selected from the group consisting of phenol and alkylated phenol which comprises dissolving the 1,1-bis(2-hydroxy-3-t-butyl-5-methylphenyl)ethane and said impurity in naphtha; contacting the solution thus formed with pyridine at about 0° to about 30° C. for a time sufficient to form a solid adduct between the 1,1-bis(2-hydroxy-3-t-butyl-5-methylphenyl)ethane and pyridine; separating the solid adduct thus formed; and dissociating the solid adduct into pyridine and substantially pure 1,1-bis(2-hydroxy-3-t-butyl-5-methylphenyl)ethane.

2. The process of purifying 1,1-bis(2-hydroxy-3-t-butyl-5-methylphenyl)ethane containing as an impurity a small amount of a compound selected from the group consisting of phenol and alkylated phenol which comprises dissolving the 1,1-bis(2-hydroxy-3-t-butyl-5-methylphenyl)ethane and said impurity in naphtha; contacting the solution thus formed with pyridine at about 0° to about 30° C. for a time sufficient to form a solid adduct between the 1,1-bis(2-hydroxy-3-t-butyl-5-methylphenyl)ethane and pyridine; separating the solid adduct thus formed; and heating the solid adduct at a temperature above about 50° C. at atmospheric pressure to dissociate the solid adduct into pyridine and substantially pure 1,1-bis(2-hydroxy-3-t-butyl-5-methylphenyl)ethane.

3. The process of purifying 1,1-bis(2-hydroxy-3-t-butyl-5-methylphenyl)ethane containing as an impurity a small amount of a compound selected from the group consisting of phenol and alkylated phenol which comprises dissolving the 1,1-bis(2-hydroxy-3-t-butyl-5-methylphenyl)ethane and said impurity in naphtha; contacting the solution thus formed with pyridine at about 0° to about 30° C. for a time sufficient to form a solid adduct between the 1,1-bis(2-hydroxy-3-t-butyl-5-methylphenyl)ethane and pyridine; separating the solid adduct thus formed; and heating the solid adduct at a temperature of about 90° C. at a pressure of about 1 mm. Hg to dissociate the solid adduct into pyridine and substantially pure 1,1-bis(2-hydroxy-3-t-butyl-5-methylphenyl)ethane.

References Cited in the file of this patent

UNITED STATES PATENTS

| | | |
|---|---|---|
| 1,795,382 | Ulrich | Mar. 10, 1931 |
| 1,980,901 | Bentley et al. | Nov. 13, 1934 |
| 2,036,916 | Bruson | Apr. 7, 1936 |
| 2,045,517 | Bruson | June 23, 1936 |
| 2,250,480 | Gump | July 29, 1941 |
| 2,321,036 | Luten | June 8, 1943 |
| 2,383,016 | Riethof | Aug. 21, 1945 |
| 2,432,062 | Cislak | Dec. 2, 1947 |
| 2,432,063 | Cislak | Dec. 2, 1947 |
| 2,459,146 | Bowman | Jan. 18, 1949 |
| 2,505,484 | Green | Apr. 25, 1950 |
| 2,634,297 | Moyle | Apr. 7, 1953 |